Figure 1:
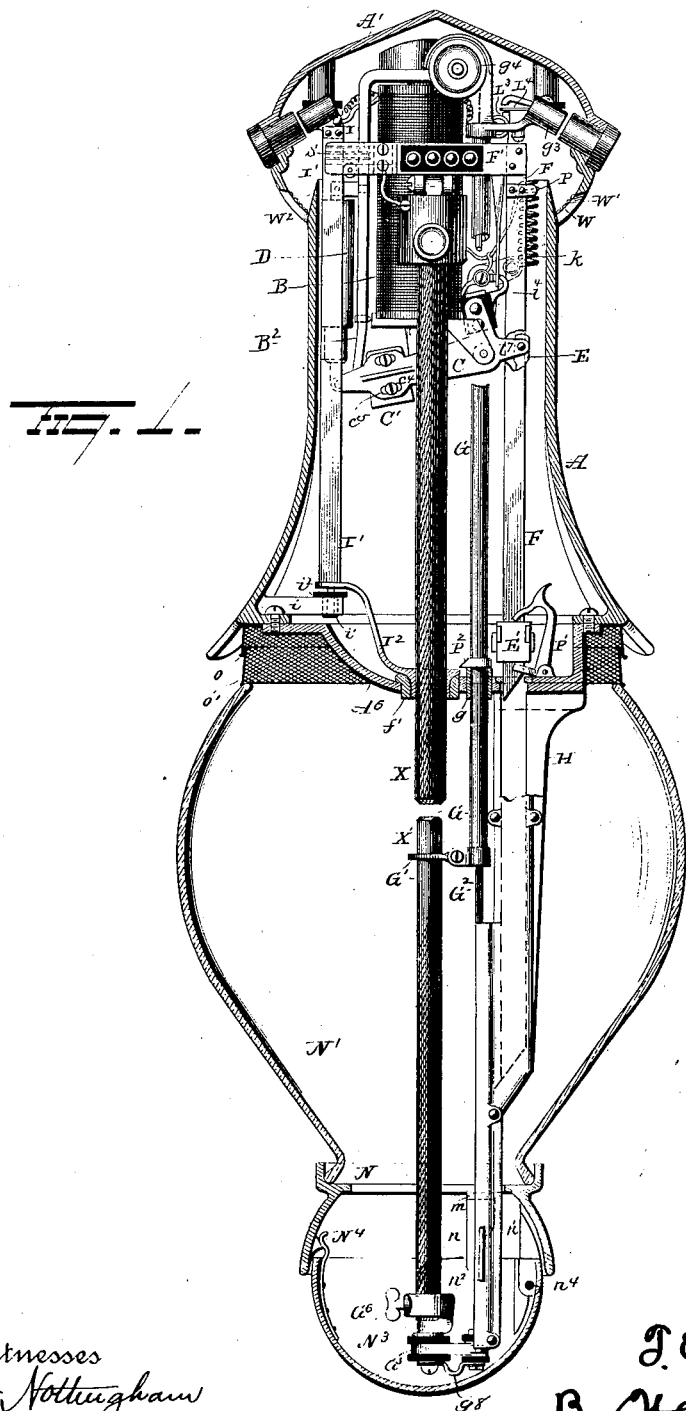

(No Model.) 8 Sheets—Sheet 1.

T. E. ADAMS.
ELECTRIC ARC LAMP.

No. 548,413. Patented Oct. 22, 1895.

Witnesses
E. J. Nottingham
G. F. Downing

Inventor
T. E. Adams
By H. A. Seymour
Attorney (No Model.) 8 Sheets—Sheet 2.

T. E. ADAMS.
ELECTRIC ARC LAMP.

No. 548,413. Patented Oct. 22, 1895.

Witnesses
E. J. Nottingham
G. F. Downing

Inventor
T. E. Adams
By H. A. Seymour
Attorney (No Model.) 8 Sheets—Sheet 5.
T. E. ADAMS.
ELECTRIC ARC LAMP.

No. 548,413. Patented Oct. 22, 1895.

Witnesses
E. J. Nottingham
G. F. Downing

Inventor
T. E. Adams
By H. A. Seymour
Attorney (No Model.)

T. E. ADAMS.
ELECTRIC ARC LAMP.

No. 548,413.                     Patented Oct. 22, 1895.

Witnesses
E. J. Nottingham
G. F. Downing

Inventor
T. E. Adams
By H. A. Seymour
Attorney

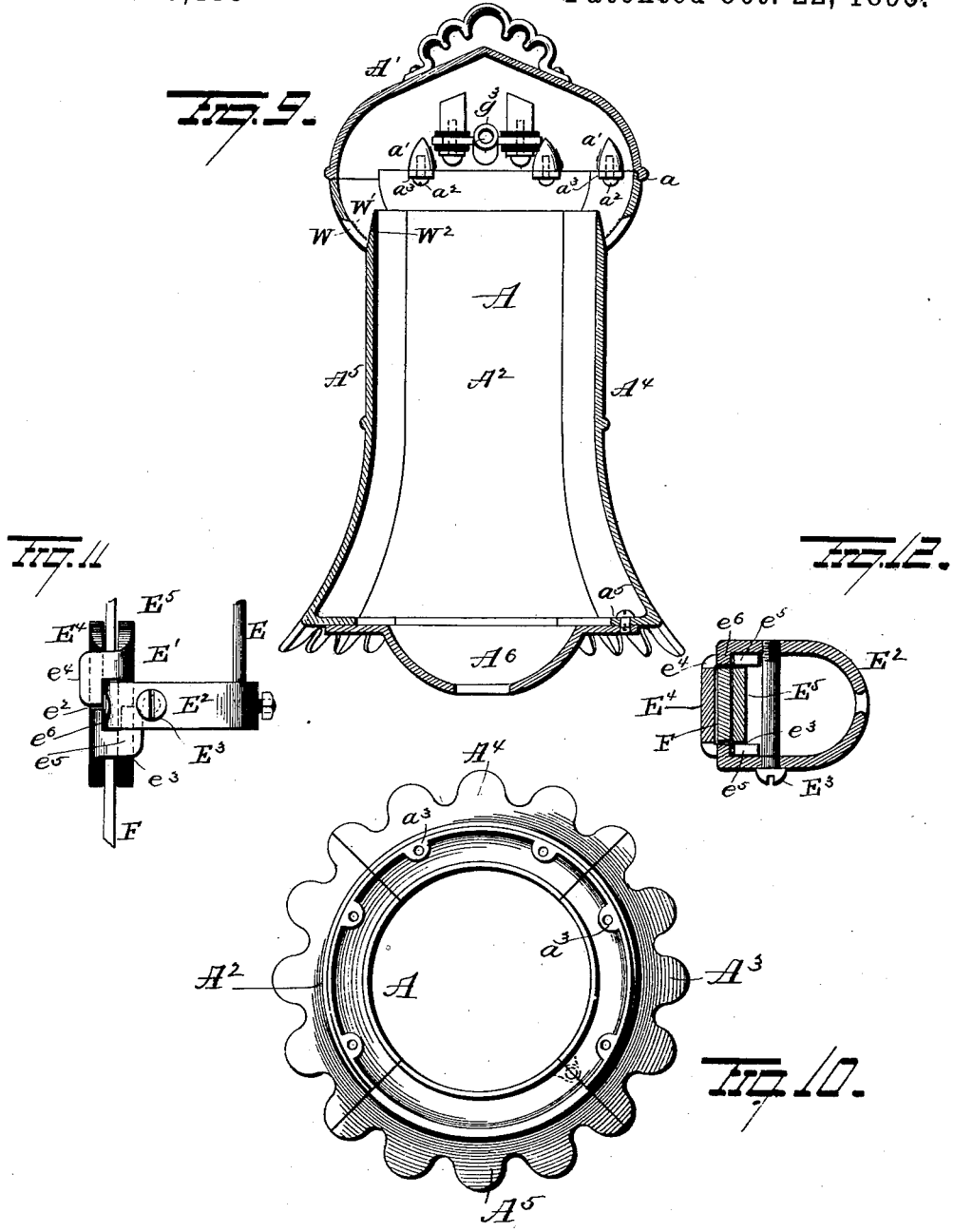

(No Model.)  8 Sheets—Sheet 8.

T. E. ADAMS.
ELECTRIC ARC LAMP.

No. 548,413.  Patented Oct. 22, 1895.

Witnesses
E. J. Nottingham
G. F. Downing

Inventor
T. E. Adams
By H. A. Seymour
Attorney

UNITED STATES PATENT OFFICE.

THOMAS E. ADAMS, OF CLEVELAND, OHIO, ASSIGNOR TO THE ADAMS-BAGNALL ELECTRIC COMPANY, OF SAME PLACE.

ELECTRIC-ARC LAMP.

SPECIFICATION forming part of Letters Patent No. 548,413, dated October 22, 1895.

Application filed July 8, 1895. Serial No. 555,343. (No model.)

*To all whom it may concern:*

Be it known that I, THOMAS E. ADAMS, a resident of Cleveland, in the county of Cuyahoga and State of Ohio, have invented certain new and useful Improvements in Electric-Arc Lamps; and I do hereby declare the following to be a full, clear, and exact description of the invention, such as will enable others skilled in the art to which it appertains to make and use the same.

My invention relates to an improvement in electric-arc lamps, the object of the invention being to provide a simple and efficient construction of electromotor-regulating mechanism for actuating the carbons and moving them into contact and then separating them to establish the arc and for regulating the length of the arc and maintaining it uniform in its length and brilliancy by adjusting and feeding both the upper and lower carbons.

A further object is to provide an improved cut-out for short-circuiting the lamp when current ceases to flow in the lamp-circuit.

A further object is to provide improved means for automatically switching a faulty lamp out of circuit.

A further object is to provide an improved cut-out by means of which a lamp after having been automatically switched out of circuit, owing to the sticking or derangement of some of its parts, will be automatically switched into circuit again in the event its carbons are fed or brought into contact with each other.

A further object is to provide a supplemental low-resistance cut-out for automatically switching a lamp out of circuit and out of operation when its carbons shall have been consumed or sufficiently consumed.

A further object is to furnish the lamp with an improved clutch and clutch-blade; also, with a globe-support of such construction that it will serve as a guide and protecting-sheath for the clutch-blade.

A further object is to provide improved means for supporting the globe; also, for an improved construction of casing, so as to render readily accessible every part of the regulating mechanism for the purpose of inspection and adjustment; also, to provide certain other features of improvement which will be hereinafter explained.

With these objects in view my invention consists in an electric-arc lamp comprising certain features of construction and combinations of parts, as will be hereinafter described, and pointed out in the claims.

Figure 2:
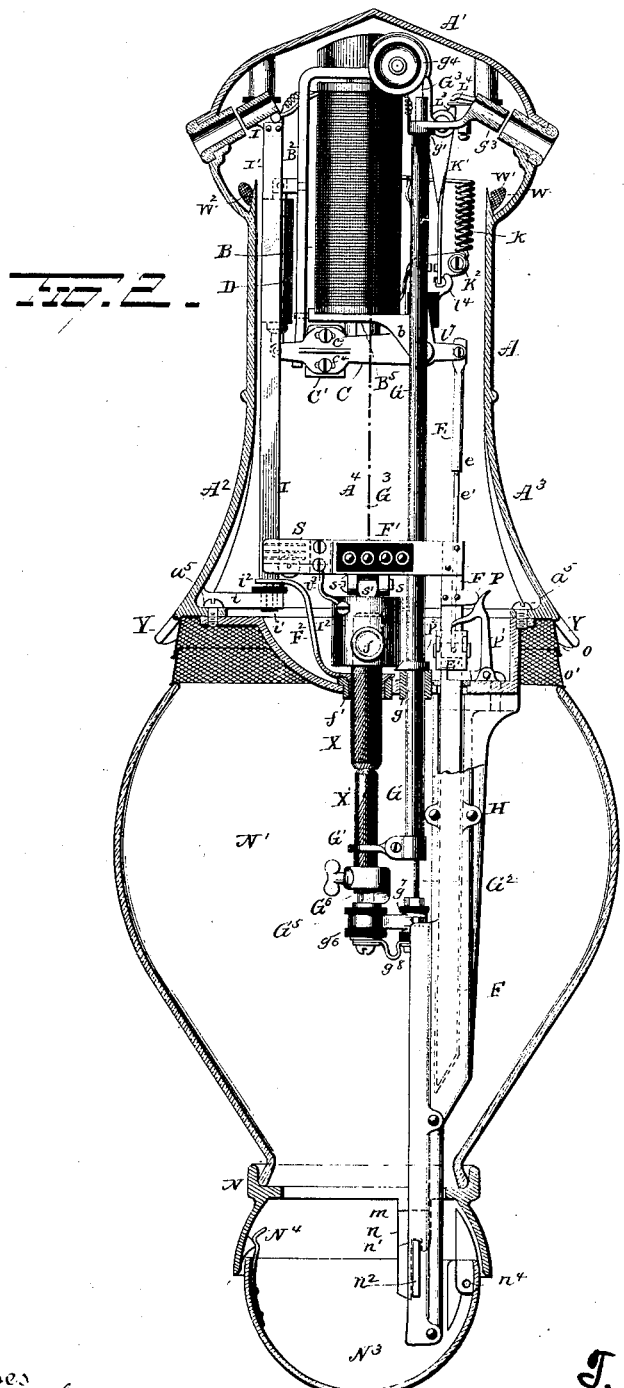
Figure 3:
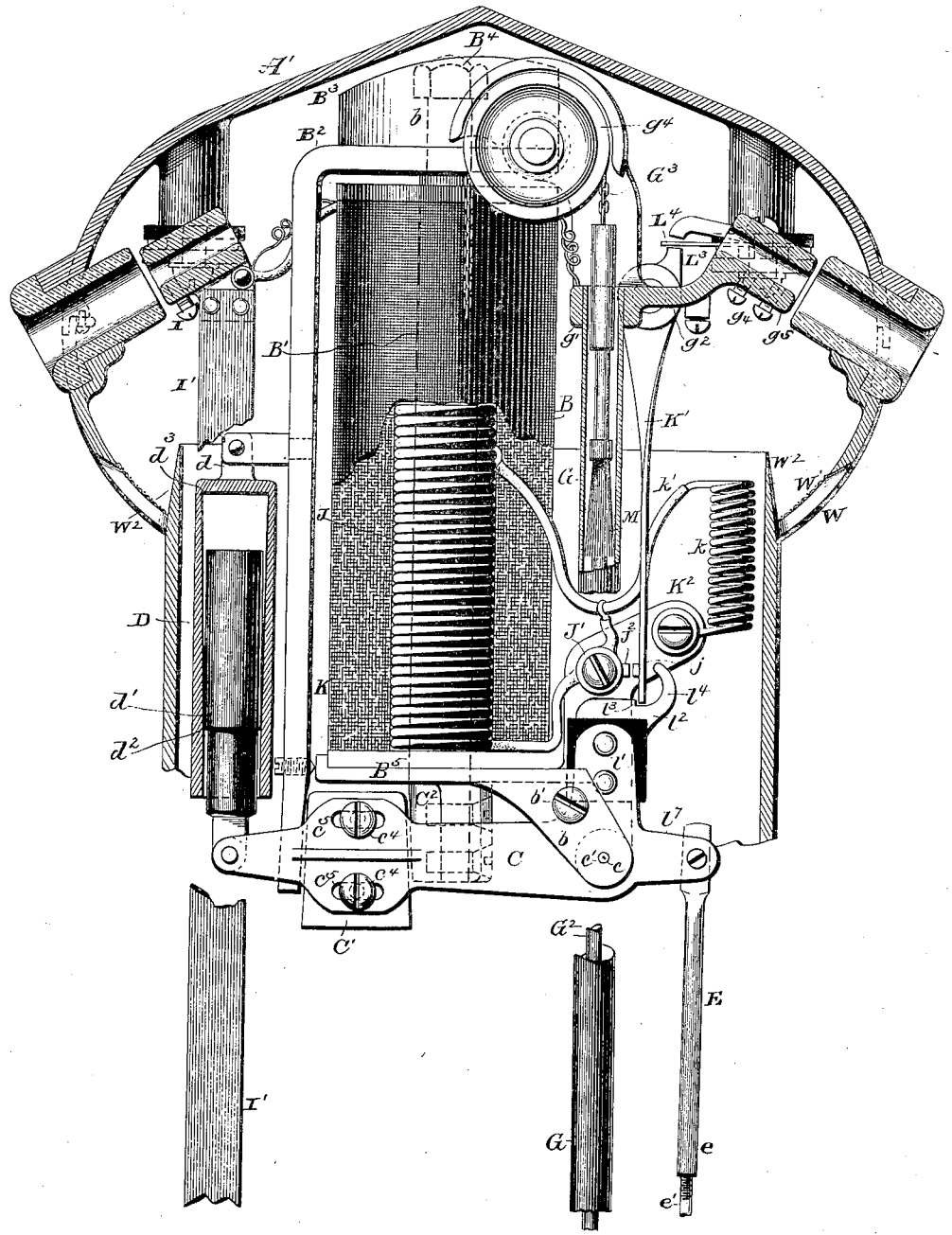
Figure 4:
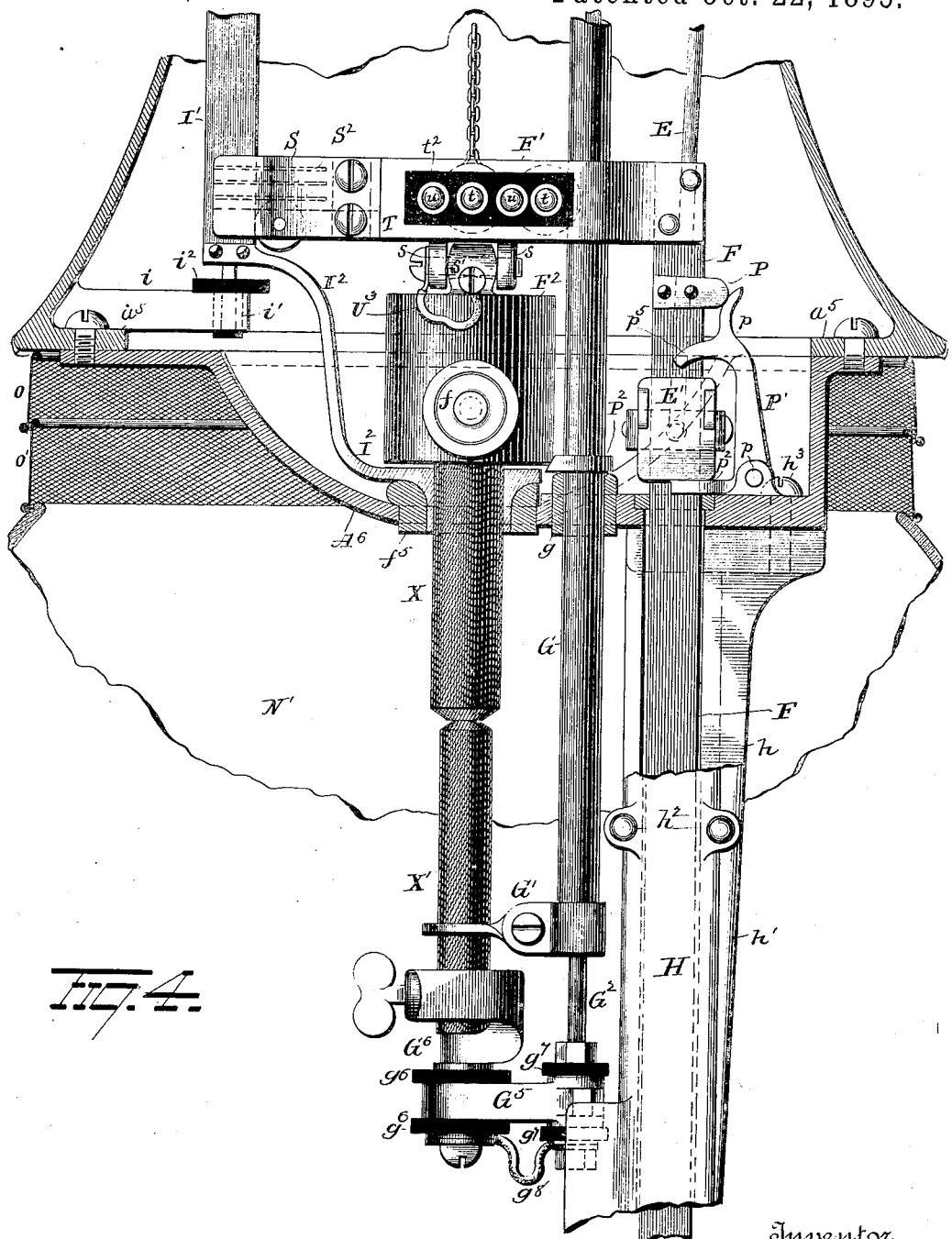
Figure 5:
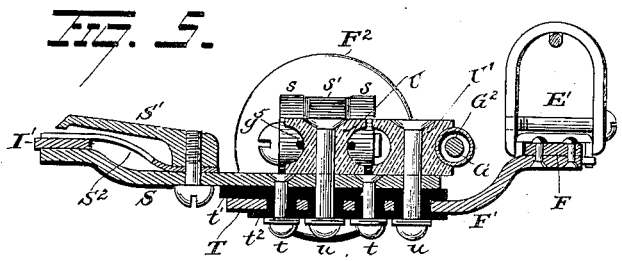
Figure 6:
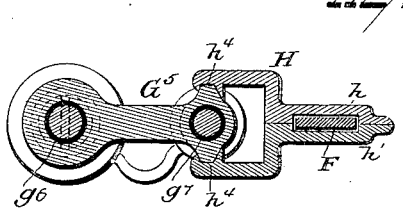
Figure 7:
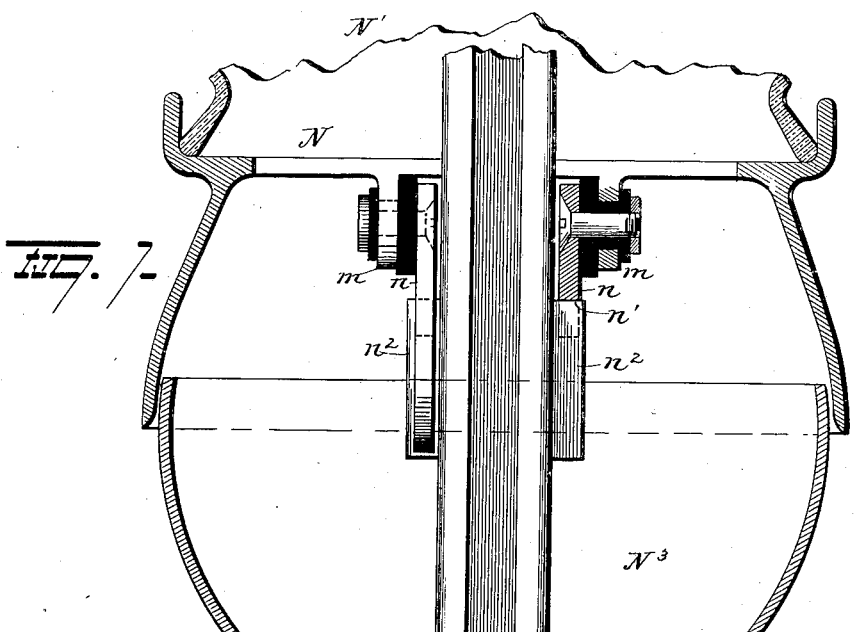
Figure 8:
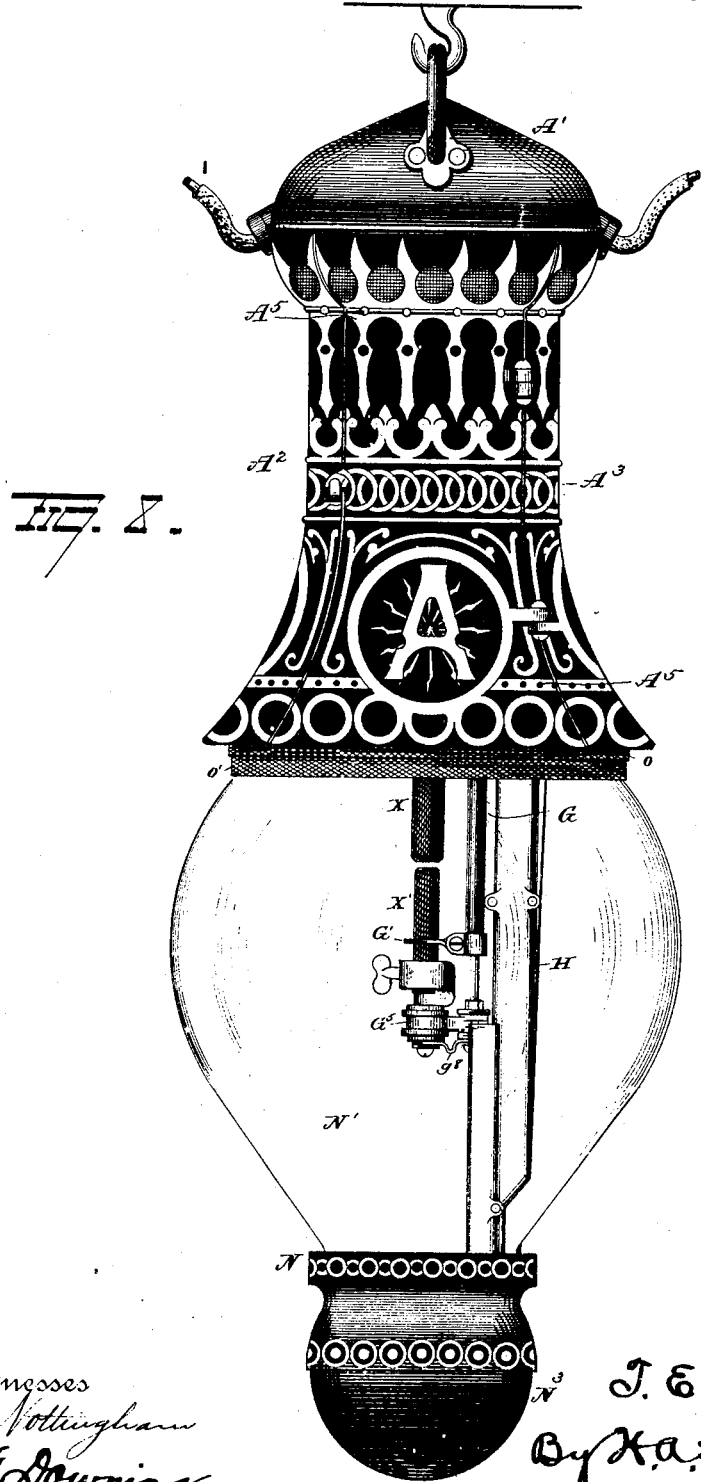
Figure 13:
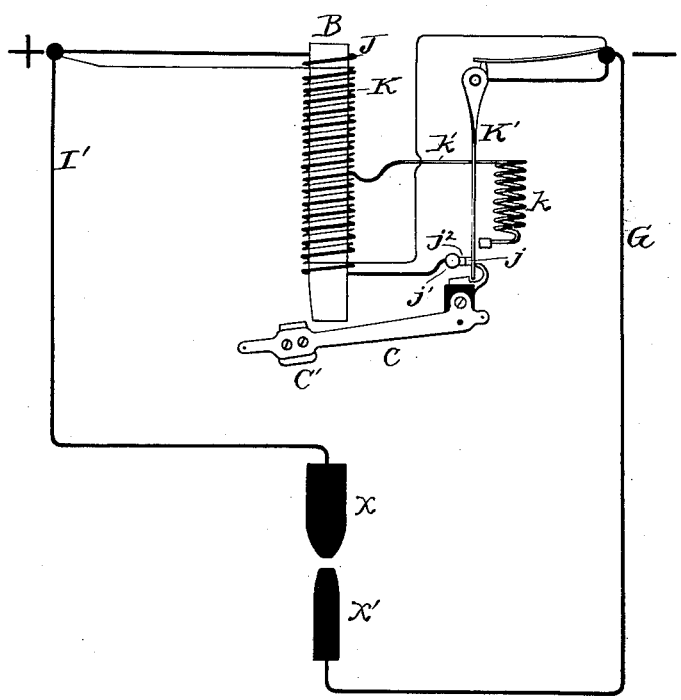

In the accompanying drawings, Figure 1 is a view, partly in vertical section and partly in side elevation, of one construction of lamp embodying my invention. The parts are represented in the positions they occupy when the lamp is not in operation. Fig. 2 is a view similar to Fig. 1, excepting it shows the lamp just after current has been switched through it and the carbons have been brought together preparatory to their separation and the establishment of the arc. Fig. 3 is an enlarged detached view of the electromotor part of the regulating mechanism. Fig. 4 is an enlarged detached view of the carbons and clutch mechanism. Fig. 5 is a transverse section taken through the cross-head. Fig. 6 is a transverse section taken through the lower portion of the sheath and lower-carbon holder. Fig. 7 is a view, partly in side elevation and partly in vertical section, of the globe-holder and cup hinged thereto. Fig. 8 is a view in side elevation of the lamp, showing the construction of the casing. Figs. 9 and 10 are sectional views of the casing. Figs. 11 and 12 are views of the clutch. Fig. 13 is a diagrammatical view of the circuits.

A represents the casing, which is preferably made of cast-iron and comprises top sections $A'$, fixed side sections $A^2 A^3$, detachable side section $A^4$, hinged door $A^5$, and bottom section or floor $A^6$. Top section $A'$ is cast in a single piece, its downwardly-projecting flange $a$ being provided with an inner shoulder $a'$, against which fit the upper ends of the side sections $A^2 A^3$, which are secured thereto by screws $a^2$, passing through lugs $a^3$, or the parts may be fastened together in any other desired manner. Detachable section $A^4$ is fastened in place by screws $a^4$, so that it may be readily removed to allow of access to the regulating mechanism on the rear side of the lamp, while that portion of the mechanism located on the front or opposite side of the lamp may be inspected and the feeding-carbon renewed by opening the hinged door $A^5$. The bottom section or floor $A^6$ of the lamp is secured to the inwardly-projecting flanges $a^5$ on the lower ends of the side sections. To the top of the casing is fastened a loop having formed therein a series of notches, in either one of which the hook by which the lamp is suspended may engage. In view of the fact that the weight of the regulating mechanism may not be centrally disposed within the casing the latter, if hung from a central bail, might not hang vertically, but by providing a series of hooks, as described, the suspending-hook may be inserted in the proper notch to cause the lamp to assume a vertical position when suspended for use. This construction of casing is strong and economical in its manufacture, affords a reliable and durable support for the regulating mechanism, and is susceptible of artistic ornamentation and finish.

B is an electromagnet, the core $B'$ of which is constructed with a screw-threaded extension $b$ at its upper end, which passes upwardly through the yoke-piece $B^2$, flat bearing or seat $B^3$, cast on the under side of the casing, and through the latter, and is secured in place by a cap-nut $B^4$. By tightening the cap-nut the electromagnet and yoke are firmly secured in place and in proper alignment with one another and with the other parts of the lamp. To the depending pole of the magnet is fastened a plate or bracket $B^5$, which is provided with downwardly-depending ears $b$, between which the armature-lever C is pivoted.

To minimize friction and wear, I provide armature-lever with steel bearing-points $c$, which are supported in countersunk holes $c'$, formed in the ears $b$. A screw $b'$ serves to draw together the ears and regulate the end play or thrust of the bearing-points $c$ of the armature-lever. This construction insures a strong and efficient pivotal connection of the parts.

Armature-lever C is provided near its free end with transversely-elongated slots $c^5$, through which are inserted screws $c^4$ for adjustably securing in place the armature $C'$, which latter is made of annealed iron and is so shaped as to move freely between the face of the pole-piece $C^2$ and the adjacent face or side of the lower end of the yoke-piece. Thus it will be observed a complete magnetic circuit is formed, which includes the magnet-core, yoke-piece, pole, and armature. The air-gap between the armature and pole may be regulated as desired by adjusting the armature on the armature-lever, while the air-gap between the armature and yoke may be adjusted and regulated by the adjusting-screw, which passes through the yoke and bears against the plate $B^5$.

An inverted-dash-pot cylinder D is pivoted at its upper and closed end to a lug $d$, fastened to the yoke-piece, while the piston-rod $d'$ is pivoted to the outer end of the armature-lever. The piston of the dash-pot may be made of any desired weight, by regulating which I am enabled to adjust the lamp for arcs of different length. I vary the weight of the piston by removing metal therefrom by drilling holes in it or otherwise removing a portion of its metal and add to its weight by inserting lead into holes drilled in it or vary its weight in any other suitable manner. There are so many ways for varying the weight of the piston that I do not restrict myself to any particular method or construction of parts for accomplishing this end. The bore of the cylinder of the dash-pot is gradually enlarged from the point $d^2$ to $d^3$, for a purpose which will be hereinafter explained.

E is a clutch-rod, which is pivoted at its upper end to the short arm $l$ of the armature-lever, while to its lower end is secured the clutch $E'$, detached views of which are represented in Figs. 11 and 12. Clutch-rod is made in two parts $e$ and $e'$, one part screwing into the other, so that the rod may be readily adjusted in length. Clutch $E'$ consists of the U-shaped bail $E^2$, through the ends of which is inserted a screw $E^3$, which serves to hold them in position. $E^4$ and $E^5$ are clamping-plates, each of which is constructed with notches $e^2$ $e^3$, formed in its side edges, and with hooks $e^4$ $e^5$. When the plates are assembled as shown, the inwardly-bent ends $e^6$ of the bail will operate to draw the plates toward one another when the bail is lifted to a horizontal position and cause the plates to engage and clutch the opposite sides of the clutch-blade or bar F and to lift it and regulate its position. When the clutch is lowered so that it rests upon the lamp-floor $A^6$ or horizontal arms of the clutch-trip, the bail will fall and operate to wedge apart the clutch-plates and release them from the clutch-blade, thereby allowing the latter to feed through them.

Clutch-blade F is a flat blade, which may be made of steel or brass or of any other desired material. It is secured at its upper end to a cross-head $F'$, to which is attached a block or socket $F^2$, in which is detachably secured the upper carbon X, a thumb-screw $f$ being provided for securing the carbon within the socket.

Cross-head F is constructed as follows: S is a transverse plate or bar which slides on the conducting guide-bar or blade $I'$ and has secured thereto a bracket $S'$, which extends in rear of the guide-bar. Between plate S and bracket $S'$ is fastened one end of a contact-brush $S^2$, the outer end of which bears against the conducting bar or guide. Depending lugs $s$ $s$ are cast or formed integral with the plate S, between which is hinged the lug $s'$ on the carbon-holder $F^2$. This hinged connection is so loose and free that the lower end of the upper carbon may freely move in any direction. To the plate S is firmly secured a plate T by means of the rivets $t$. These plates S and T are insulated from one another by means of the mica plates $t'$ and washers $t^2$. Two porcelain rollers U U' are secured by rivets $u$ to the rear side of the plate S. Chain $G^3$ is connected with the roller U by means of a bail or ring $g^5$, encircling the roller U, while the other roller U' serves as a slide on the tube G. To the outer end of the plate T is riveted the upper end of the clutch-blade F. The cross-head and carbon socket or holder are connected by a flexible conductor $U^3$. From the foregoing it will be observed that the cross-head is composed of two parts which are insulated from one another, whereby one portion serves as a conductor for carrying current to the positive carbon.

The upper carbon X passes freely through an insulating-thimble $f^5$, fitted into the lamp-floor. In view of the fact that the socket or holder $F^2$ is free to adjust itself laterally the upper carbon though crooked or out of alignment will readily feed through the insulating-thimble.

G is a tube extending through the lamp-floor and insulated therefrom by an insulating washer or sleeve $g$. The upper end of the tube is fastened to a sleeve $g'$, formed on an arm $g^2$ of the terminal sleeve $g^3$. A set-screw $g^5$ serves to secure the end of the conductor within the terminal sleeve. To the lower end of the tube G is fastened a forked or ring guide G', through which the lower carbon X' moves freely and is guided. A metal rod $G^2$ extends through tube G and has secured to its upper end one end of a chain $G^3$, which passes over a sheave $g^4$ and is fastened at its other end to the bail $g^5$ of the cross-head. To the lower end of the rod $G^2$ is fastened a bracket $G^5$, in the outer end of which is secured the lower-carbon holder $G^6$, which is insulated from the bracket by an insulating-washer $g^6$. Bracket $G^5$ is insulated from the rod $G^2$ by means of an insulating-sleeve $g^7$. The lower-carbon holder and the rod $g^2$ are electrically connected by the conductor $g^8$.

H is a sheath, which is preferably made of two sections $h$ $h'$, which are secured together by screws $h^2$. The upper end of the sheath is provided with an outwardly-projecting flange, which seats against the under side of the lamp-floor and is secured thereto by the screws $h^3$. Clutch-blade F fits loosely within the sheath, which is placed edgewise to the arc, so as to offer the minimum obstruction to the rays of light. The lower portion of the sheath on its inner edge is provided with parallel ways $h^4$ $h^4$, with which engages a slide or cross-head formed on the bracket $G^5$. By this construction the lower carbon is guided throughout the range of its vertical adjustment and securely retained against rotary displacement.

I is the positive terminal of the lamp, to which is secured by screws or rivets the conducting guide-bar or blade I', the lower end of which is fastened to a lug or flange $i$, connected to or formed integral with the casing, and is insulated therefrom by means of the insulating-sleeve $i'$ and washer $i^3$. A sheet-metal strip $I^2$ of good electrical conductivity is fastened at one end to the conducting-guide I', while its opposite end is perforated and so formed as to encircle and fit into the insulating-sleeve, through which the upper carbon passes. The upper carbon as it is fed will rub against the conducting-strip $I^2$ and keep it bright and maintain therewith a good electrical contact, whereby a larger proportion of the current flowing to the arc will be conducted by means of this strip directly to the upper carbon and at a point near its lower end, which of course materially reduces the resistance to the flow of current.

Electromagnet B is wound with a coarse-wire helix J, one end of which is connected with the positive terminal of the lamp, while its opposite end is connected with a contact-post J', which is provided with a stationary contact $J^2$, which may be made of platinum, silver, carbon, or other desired material. A fine-wire helix K also encircles the core of electromagnet B and is wound in the same direction as the coarse-wire helix. The opposite ends of the fine-wire helix are secured, respectively, to the positive and negative terminals of the lamp, and thus form a shunt to the arc.

K' is a switch-lever, its hinged end being of large current-carrying capacity and constructed with a rule-joint, and preferably furnished with a spring-washer, whereby its free end will remain in any position to which it may be moved. The lower and free end of the switch-lever is furnished with a contact $j$, which engages the stationary contact $J^2$. A contact-post $K^2$, arranged to be engaged by the lower end of the switch-lever K' when moved outwardly to the limit of its travel, has one end of a resistance coil or stack $k$ connected therewith, the opposite end being connected in series by a conductor $k'$ with some portion of the coarse-wire helix. The proportion of the coarse-wire helix which will be included in series with the resistance $k$ can readily be determined by proper tests.

The short arm $l$ of the armature-lever C is constructed with an upwardly-projecting arm $l'$, to which is riveted a contact-block $l^2$, but insulated from $l'$ and having a shoulder $l^3$ and a finger $l^4$. When no current is passing through the lamp and the armature-lever is in its depressed position, finger $l^4$ will engage the lower end of the switch-lever, and thereby maintain the contacts $J^2$ and $j$ closed for the passage of current through them. When the armature-lever is raised to its normal position, the shoulder $l^3$ will strike the lower end of the switch-lever and open the contacts $J^2$ $j$ and open the circuit of the coarse-wire helix. When the armature-lever is raised to an abnormal height, due to the passage of an abnormally-strong current through the shunt-wire helix, shoulder $l^3$ will move the switch-lever into contact with the contact-post $K^2$, and thereby close the circuit through a portion of the coarse-wire helix and the resistance in series therewith.

The upper end of the switch-lever is constructed with a projection L³, which presses against a spring L⁴ when the lower end is moved nearly into contact with the post K². This spring operates to open the contact between the switch-lever and post K² before the carbon points have been separated so as to prevent the formation of a spark between such contacts when separated.

The plate or bracket B⁵, to which the armature-lever is hinged, is constructed with a bracket, on which are mounted the stationary and the cut-out contacts.

The negative terminal $g^3$, tube-socket $g'$, and bracket-arms in which the sheave is journaled are all cast in a single piece, while the spring-stop L⁴ may be cast integral with the other parts or may be made in a separate piece and riveted thereto.

To insure a good contact between the tube G and guide-rod G², a wire contact-brush M is attached to the guide-rod and moves with it, and thereby maintains good contact between the tube and rod therein.

N is a globe-pan in which is seated the lower end of the globe N' and is constructed with depending flanges $m$, and secured thereto and properly insulated therefrom are depending arms $n$, which are provided with one or more notches $n'$, in which engage the elongated lugs $n^2$, (one or more,) formed in the side of the sheath. By simply lifting the globe-pan and globe and disengaging the notch and lug the globe may be lowered and readily removed.

To the lower portion of the globe-pan is hinged at $n^4$ a semicircular cup N³, which is provided on its free end with a spring-catch N⁴, by which it is detachably fastened to the globe-pan.

Telescopic wire-gauze sections O O' are fastened to the casing and globe for excluding insects, &c., from the arc.

The inwardly-beveled portion of the lamp-casing is cast with a circular series of openings W, which are covered by wire-gauze W'. The walls of the casing in rear of these openings are beveled, as shown at W², whereby any rain that may beat through the wire-gauze coverings will run downwardly and be prevented from entering the casing. These openings afford a free circulation of the outer air throughout the interior of the casing, and consequently prevent the magnets or other parts from becoming unduly heated. The lower end of the casing is constructed with a downwardly-projecting flange having a fluted edge Y, which, while serving to protect the wire-gauze telescopic sections, allows of the free escape of heated air.

Having described the construction of parts of my improved lamp, I will now describe its operation.

When no current is passing through the lamp, the armature-lever will be in its lower position, as illustrated in the detached view of Fig. 1, and the clutch will engage the clutch-blade and serve to uphold it, and thereby maintain the carbons in a separated relation, and thus prevent the passage of any current through them. In this condition there are two circuits through the lamp—to wit., one through the constantly-closed high-resistance shunt-helix, and another through the coarse-wire helix, contacts $J^2 j$, and switch-lever to the negative terminal of the lamp. On the passage of current through the lamp practically the entire current will flow through the low-resistance circuit, including the coarse-wire helix, with the result that the latter will be energized and will impart sufficient strength to the magnet to lift the armature, thereby lowering the clutch and cause it to release the clutch-blade, and thus allow the upper carbon to feed downwardly and the lower carbon to feed upwardly until the two are brought into contact with one another. The armature as it is raised by the action of the coarse-wire magnet attains sufficient momentum to cause the shoulder $l^3$ on the armature-lever to engage the lower end of the switch-lever and open the contacts $J^2 j$, and thus break the circuit through the coarse-wire magnet. In order that the armature may operate with a certainty to open the contacts $J^2 j$, and thus open the circuit of the coarse-wire helix, the upper portion of the bore of the dash-pot is enlarged, as I have already explained, and thereby insures perfect freedom of action to the armature-lever when at the highest limit of its travel. Immediately on the opening of the circuit of the coarse-wire helix all the current which had hitherto passed through it is instantly diverted through the conducting blade or bar, from which part of the current flows to and through the carbons by way of the contact-brush conductor S² and carbon holder or socket F², while the remainder flows through the contact-strip I² to the upper carbon.

Upon the breaking of the circuit, including the coarse-wire helix, the magnet is rendered so weak as to be incapable of upholding the armature, which will instantly drop, with the result that the clutch will instantly grip and raise the clutch-bar and upper carbon and at the same time depress the lower carbon, thus interrupting the circuit and establishing an arc between the carbons. The armature-lever in dropping and establishing the arc does not fall to the limit of its downward movement because immediately upon the establishment of the arc the resistance of the latter to the passage of current through it will operate to divert such an amount of current through the fine-wire shunt-helix as to so strengthen it that it will serve to uphold the armature in such a position as will result in the maintenance of an arc of uniform length and brilliancy. As the carbons are gradually consumed the arc elongates, with the result that its resistance is increased, and hence an increased amount of current is diverted through the shunt-magnet, rendering it sufficiently strong to depress the clutch until it strikes the lamp-floor or clutch-trip lever P', when it releases its grasp on the clutch-blade and allows the latter to feed through it and cause the carbons to feed toward one another. As the carbons approach one another the arc is shortened, its resistance decreased, and the shunt-magnet is correspondingly weakened, whereby the armature descends slightly and separates the carbons. In this manner the mechanism of the lamp automatically regulates the length of the arc and feeds the carbons to compensate for their wearing away in burning. Throughout the adjustment of the armature in the normal operation of the lamp its movement is made gradual and is rendered perfectly steady and uniform by means of the dash-pot, the piston of which is at such times within the comparatively tight-fitting portion of the bore of the cylinder. The weight of the parts connected with the upper carbon is made slightly less than the weight of the armature and lever and also of the parts connected with the lower carbon, so that as the armature and lower carbon descend the upper carbon will be raised and the carbons will be separated. From the foregoing it will be observed that the establishment of the arc is effected by the action of the coarse-wire magnet, which is in a circuit around the arc, while the regulation of the length of the arc and the feed of the carbons is effected by the varying strength of the fine-wire magnet acting in opposition to the weight of the armature and its lever.

The carbons are adjusted and fed until they have been consumed or sufficiently consumed, when a lug P on the clutch-blade engages the long arm $p$ of a bell-crank lever P', which is pivoted at $p'$, and thereby raises the short arm $p^2$, on which rests the clutch, and consequently disengages the latter from the clutch-blade and allows the upper-carbon holder to drop into contact with the conducting-strip and with a lug or collar $P^2$, secured to the tube G. In this way the current is short-circuited through the carbon-holder and the tube G, through which it flows to the negative terminal of the lamp.

The trip-lever P' is provided with an arm $p^5$ at its upper end, which extends over the top of the clutch and limits its upward movement.

In the event the lamp should refuse to feed by reason of the sticking or derangement of some of the parts of its regulating mechanism the carbons will continue to burn away and the arc will grow longer and longer, with the result that the magnet will be rendered abnormally strong by reason of the abnormally-strong current diverted through the fine-wire helix. As a result of this action, the magnet will lift the armature to such a height that the shoulder $l^3$ on the armature-lever will strike the switch-lever and move it over and into contact with the post $K^2$, thereby establishing a cut-out circuit around the arc composing a part of the coarse-wire helix and the resistance-coil $k$ in series therewith. This cut-out circuit will maintain the integrity of the main circuit and prevent the extinguishment of other lamps burning therein, and so long as the carbons remain in a separated relation the cut-out circuit will be maintained by the action of that portion of the coarse-wire helix which forms a part of it; but in the event the carbons should feed together, which might result from jarring the lamp or from some other cause, then the carbons would form a closed circuit through the lamp of such low resistance that a greater portion of the current which had hitherto passed through the coarse-wire helix will now be shunted around it, with the result that it will be so weakened as to be incapable of upholding the armature, which will drop and again establish the arc.

I employ a weight to act in opposition to the pull of the coarse and fine wire magnets because it is far superior in its operation to that of a spring. The weight exerts practically a constant force throughout the entire range of movement of the armature, though it acts most effectively when it is opposing the action of the fine-wire magnet in effecting the adjustment and regulation of the carbons, because when so acting the armature is in a position to afford the weight its maximum leverage, while a spring could not act with any degree of uniformity throughout so wide a range of adjustment.

By feeding the upper and lower carbons I provide a lamp in which the arc is maintained at practically a fixed point, and hence I am enabled to use a smaller globe than would be possible with a lamp in which the lower carbon is stationary, which results in the gradual lowering of the arc as the carbons burn away.

By employing a pair of carbons in which the upper or feeding carbon is five-eighths of an inch in diameter and fourteen inches in length and the lower or negative carbon is one-half an inch in diameter and twelve inches in length I am enabled to maintain an arc of normal and uniform brilliancy for from fourteen to eighteen hours, a sufficient length of time to last all night.

Having fully described my invention, what I claim as new, and desire to secure by Letters Patent, is—

1. In an electric arc lamp, the combination with the electrodes, of a coarse wire helix, a switch for switching the coarse wire helix into and out of a low resistance circuit around the electrodes and a weighted armature and armature lever, and devices connected with the armature lever for adjusting and feeding the electrodes, said parts being constructed and arranged substantially as described whereby the weighted armature serves to retain the electrodes in a separated relation when no current is passing through the lamp and on the passage of current through the lamp to be raised by its acquired momentum above its normal position for feeding the carbons and thereby bring the carbons into contact and then open the switch contacts and switch the coarse wire helix out of circuit and then fall into its normal position for feeding and separate the electrodes and establish an arc between them, substantially as set forth.

2. In an electric arc lamp, the combination with the electrodes, and a magnet for causing the electrodes to move into contact, of a pivoted lever, a weighted armature for said magnet, carried by the lever for separating the electrodes and establishing the arc, and a switch in the path of movement of said lever and adapted to be operated by the momentum of the weighted armature to open-circuit said magnet, substantially as set forth.

3. In an electric arc lamp, the combination with the carbons, a coarse wire magnet and an armature for said magnet, of a switch and a resistance connected in series with a part only of the helix of the coarse wire magnet, substantially as set forth.

4. In an arc lamp, the combination with a guide rod and the lower carbon holder connected thereto, of a sheath disposed at one side thereof, parallel flanges or guide ways projecting from said sheath toward said carbon holder, a bracket connecting said guide rod and carbon holder and a cross head on said bracket and disposed between said parallel flanges or guide ways, substantially as set forth.

5. In an arc lamp, the combination with the carbon holders, of a guide rod secured to the lower carbon holder, a flexible connection between said guide rod and the upper carbon holder, a sheath, a clutch blade in said sheath, a clutch, guide ways on the sheath, and a bracket projecting from the lower carbon holder and having one end disposed between said guide ways, substantially as set forth.

6. The combination with the clutch blade, of a flattened sheath arranged edgewise to the arc, substantially as set forth.

7. The combination with a sheath secured to the under side of the lamp floor, a clutch blade arranged to pass through the lamp floor and into the sheath and a clutch situated above the lamp floor, substantially as set forth.

8. The combination with a tube and rod moving therein, of the lower carbon-holder connected to said rod below the tube, and guide ways below and independent of the tube for retaining the lower carbon-holder in proper position, substantially as set forth.

9. In an arc lamp, the combination with a vertically movable cross head, of an upper carbon holder pivotally connected thereto, a sleeve in the floor of the lamp through which the upper carbon is guided and guides for the respective ends of the cross head, substantially as set forth.

10. In an arc lamp, the combination with the casing, a magnet secured thereto and a yoke piece disposed alongside the magnet, a bracket secured to the depending pole of the magnet, an armature lever pivoted in said bracket, an armature carried by said lever and entering between the pole of the magnet and the yoke piece, and an adjusting screw passing through the yoke piece and engaging said bracket, substantially as set forth.

11. The combination with the magnet, its armature and a cut-out switch, of a dash-pot having the bore of its cylinder enlarged at one end, substantially as set forth.

12. The combination with a magnet and a plate secured to its lower end said plate having depending ears, of an armature provided with steel pointed bearings, which fit in countersunk openings in said depending ears, and a screw passing through the ears for securing the armature bearings in place, substantially as set forth.

13. The combination with the upper sections of the lamp casing constructed with a flat seat on its under side, of a magnet having a core constructed with a screw threaded extension which extends through the seat and casing, a yoke interposed between the magnet and seat, and a nut for securing the parts in place.

14. A casing for an electric arc lamp consisting of a top section cast in a single-piece, side sections, fastened to the top section, one detachable side section, a hinged door, and a bottom section fastened to the side sections, substantially as set forth.

15. The combination with the depending sheath having an elongated bearing formed on its lower end, of a globe piece constructed with a depending flange provided with a notch within which engages the bearing on the sheath, substantially as set forth.

16. In an electric arc lamp, a casing for the regulating mechanism provided with a bottom or floor to exclude the gases from contact with the regulating mechanism, of a clutch sheath located beneath the floor, a clutch located above the floor, an upper carbon-holder constructed to allow the upper carbon to move laterally and thereby freely pass through an opening in the lamp floor, and a tube extending through the floor for the passage of the guide rod and support for the lower carbon, substantially as set forth.

17. In an electric arc lamp the combination with the lamp casing and globe, of telescopic wire gauze sections between the globe and casing, substantially as set forth.

18. In an electric arc lamp, the combination with fine and coarse wire helices, an armature, and a switch lever, of a contact a resistance included in series with the contact and some portion of the coarse wire helix, and a spring for moving the switch lever out of engagement with said contact, substantially as set forth.

19. In an electric arc lamp, the combination with a flat clutch blade, of a clutch consisting of two interlocking plates adapted to receive said clutch blade between them, and a tilting bail for opening and closing said plates, substantially as set forth.

20. A clutch consisting of two plates having interlocking hooks on their side edges, and a bail having hooked ends which engage between the hooks on the adjacent edges of the plates, substantially as set forth.

21. In an arc lamp, the combination with an upper carbon holder, a clutch blade carried thereby and a clutch to grasp said clutch blade, of a device constructed and adapted to be actuated by the clutch blade to automatically trip the clutch when the carbons have been consumed or sufficiently consumed, substantially as set forth.

22. In an electric arc lamp the combination with the upper carbon-holder of the tube disposed alongside said carbon holder and electrically connected with the negative terminal of the lamp, and a contact secured to the tube in the path of said carbon holder and serving to short circuit the carbons when the latter have been consumed or sufficiently consumed, substantially as set forth.

23. The combination with the cut out switch lever, of an armature lever provided with a finger for holding the lever in a position to close the contacts of the coarse wire magnet circuit, and provided with a shoulder for shifting the switch and opening the contacts, substantially as set forth.

24. In an arc lamp, the combination with an upper carbon holder and means for moving and guiding the same, of a tube, a rod in said tube, a lower carbon holder carried by said rod, and a guide carried by the tube, through which the lower carbon passes, substantially as set forth.

25. In an arc lamp, the combination with a magnet and a shunt circuit including a portion of the coil of said magnet, of a plate having ears, an armature lever mounted in said ears, a stationary contact on said plate included in said shunt circuit, a cut out contact also on said plate, and a switch lever disposed between said contacts, substantially as set forth.

26. The combination with the bracket of the negative terminal, a switch lever hinged to the bracket, a spring attached to the bracket and arranged to engage a projection on the switch lever a spring stop for limiting the action of the spring and means for actuating said lever, substantially as set forth.

27. In an electric arc-lamp the combination with the guide blade or bar, of a cross-head provided with an arm disposed at one side of said blade or bar and contact-brush which engage said blade at the opposite side thereof, substantially as set forth.

28. The combination with the clutch blade and clutch of a tripping lever on which the clutch rests, and a lug on the clutch blade for actuating it and disengaging the clutch from the clutch blade, substantially as set forth.

29. The combination with the clutch blade and clutch, of a tripping lever on which the clutch rests, said lever being provided with an arm which limits the upward movement of the clutch, substantially as set forth.

30. In an electric arc lamp the casing provided with a series of openings around the inwardly inclined portion of its top, wire gauze covering said openings and beveled walls in rear of said wire gauze coverings, substantially as set forth.

31. The combination with the globe and telescopic wire gauze sections, of the casing having an outwardly flaring fluted lower edge, substantially as set forth.

In testimony whereof I have signed this specification in the presence of two subscribing witnesses.

THOMAS E. ADAMS.

Witnesses:
R. S. FERGUSON,
S. W. FOSTER.